United States Patent [19]

Hicks et al.

[11] 4,044,337

[45] Aug. 23, 1977

[54] INSTRUCTION RETRY MECHANISM FOR A DATA PROCESSING SYSTEM

[75] Inventors: Glen LeRoy Hicks, Endwell; Leland Delmar Howe, Jr., Owego; Frank Anthony Zurla, Jr., Binghamton, all of N.Y.

[73] Assignee: International Business Machines Corporation, Armonk, N.Y.

[21] Appl. No.: 643,998

[22] Filed: Dec. 23, 1975

[51] Int. Cl.² ............................................. G06F 11/00
[52] U.S. Cl. ..................................................... 364/200
[58] Field of Search ..................................... 340/172.5

[56] References Cited

U.S. PATENT DOCUMENTS

| | | | |
|---|---|---|---|
| 3,533,082 | 10/1970 | Schnabel et al. | 340/172.5 |
| 3,760,364 | 9/1973 | Yamauchi et al. | 340/172.5 |
| 3,889,237 | 6/1975 | Alferness et al. | 340/172.5 |

*Primary Examiner*—Gareth D. Shaw
*Assistant Examiner*—C. T. Bartz
*Attorney, Agent, or Firm*—Richard E. Bee

[57] ABSTRACT

An instruction retry mechanism for enabling a digital data processing system having main, buffer and local stores to restart and, in most cases, recover from an error or failure in the processor hardware associated with the buffer and local stores. A first copy storage mechanism is provided for temporarily storing copies of data written into the local store. Two separately addressable multibit copy storage locations are provided for each local store address. One is capable of holding a copy of the latest data written into a given local store address during the most recent machine instruction cycle involving such address, and the other is capable of holding a copy of the latest data written into the same local store address during the next most recent machine instruction cycle involving such address.

A second copy storage mechanism is provided for temporarily storing copies of data written into the buffer store by the instruction processing or instruction execution portion of the system. The storage capacity for this second copy mechanism is substantially smaller than the storage capacity of the buffer store. When the copy store becomes nearly full, room is made for new copies by causing the buffer store to copy back to the main store some of the modified data in the buffer store. This enables new buffer store data to be copied into the copy store in place of the data copied back to the main store without harm to the retry capability of the system. Three separately addressable multibit copy storage locations are provided for each buffer store address having a data copy in the copy store. One is capable of holding a copy of the latest data written into a given buffer store address during the most recent machine instruction cycle involving such address, and another is capable of holding a copy of the latest data written into the same buffer storage address during the next most recent machine instruction cycle involving such data. The third location is used to store a copy of the buffer store address and the main store address for the data Upon occurrence of a machine check interrupt or other error condition necessitating an instruction retry, all the copy data and address information in both copy storage mechanisms is transferred to a separate service processor which controls the retry operation. The service processor restores the data in the system to the condition which existed at the end of the machine instruction immediately preceding the instruction cycle during which the failure occurred. The service processor then instructs the system to repeat the instruction during which the failure occurred. Because two data copy locations are provided for each local store or buffer store address and because these two locations are used during different machine instruction cycles, one of them will, in most cases, include the proper copy for restoring the system to the condition existing at the start of the defective cycle.

10 Claims, 11 Drawing Figures

| TYPE OF OPERATION | BEFORE E/O | BEFORE CHG | AFTER E/O | AFTER CHG | LOCATION OF RETRY COPY |
|---|---|---|---|---|---|
| LOCAL STORE COPY | 0 | 0 | 1 | 1 | EVEN |
|  | 0 | 1 | 0 | 1 | ODD |
|  | 1 | 0 | 0 | 1 | ODD |
|  | 1 | 1 | 1 | 1 | EVEN |
| $T_0$ RESET | 0 | 0 | 0 | 0 | EVEN |
|  | 0 | 1 | 0 | 0 | EVEN |
|  | 1 | 0 | 1 | 0 | ODD |
|  | 1 | 1 | 1 | 0 | ODD |

FIG. 7

| TYPE OF OPERATION | BEFORE VALID | BEFORE DC | BEFORE CHG | BEFORE E/O | AFTER VALID | AFTER DC | AFTER CHG | AFTER E/O | LOCATION OF RETRY COPY |
|---|---|---|---|---|---|---|---|---|---|
| BUFFER STORE COPY | 0 | 0 | 0 | 0 | 1 | 0 | 1 | 0 | MAIN STORE |
|  | 0 | 0 | 0 | 1 | INVALID | | | | N/A |
|  | 0 | 0 | 1 | 0 | " | | | | " |
|  | 0 | 0 | 1 | 1 | " | | | | " |
|  | 0 | 1 | 0 | 0 | " | | | | " |
|  | 0 | 1 | 0 | 1 | " | | | | " |
|  | 0 | 1 | 1 | 0 | " | | | | " |
|  | 0 | 1 | 1 | 1 | " | | | | " |
|  | 1 | 0 | 0 | 0 | 1 | 1 | 1 | 1 | EVEN |
|  | 1 | 0 | 0 | 1 | INVALID | | | | N/A |
|  | 1 | 0 | 1 | 0 | 1 | 0 | 1 | 0 | MAIN STORE |
|  | 1 | 0 | 1 | 1 | INVALID | | | | N/A |
|  | 1 | 1 | 0 | 0 | 1 | 1 | 1 | 1 | EVEN |
|  | 1 | 1 | 0 | 1 | 1 | 1 | 1 | 0 | ODD |
|  | 1 | 1 | 1 | 0 | 1 | 1 | 1 | 0 | ODD |
|  | 1 | 1 | 1 | 1 | 1 | 1 | 1 | 1 | EVEN |
| $T_0$ RESET | n | n | 0 | n | n | n | 0 | n | PER E/O BIT |
|  | n | n | 1 | n | n | n | 0 | n | PER E/O BIT |
| COPY BACK | n | n | 0 | n | 0 | 0 | 0 | 0 | MAIN STORE |
|  | n | n | 1 | n | DO NOT COPY BACK | | | | UNCHANGED |

FIG. 9

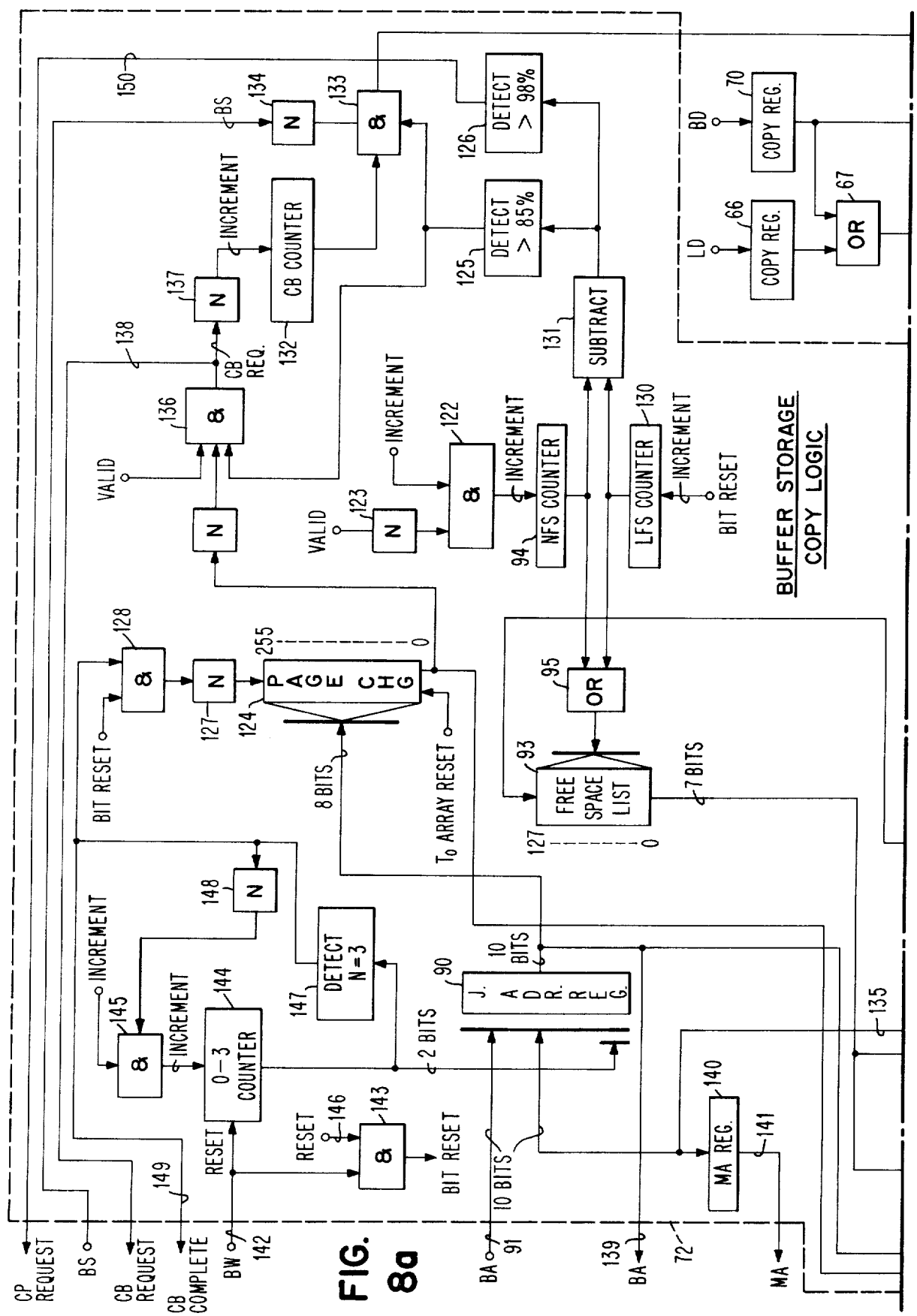

INSTRUCTION RETRY MECHANISM FOR A DATA PROCESSING SYSTEM

BACKGROUND OF THE INVENTION

This invention relates to retry mechanisms for digital computers and digital data processors for enabling such computers and processors to automatically and correctly recover from intermittent and transient hardward-generated errors.

Various methods have been heretofore proposed for enabling digital data processors to recover from intermittent and transient errors. One previously proposed approach is to stop the data processing completely upon detection of an error and restarting over again from the beginning. This restarting is accomplished by reloading the program by means of an initial program load. Another known method uses a programmed retry technique called "checkpointing". In this method, every program is written to incorporate retry provisions which include insertion of checkpoints within a computer program and instructions for saving all system data and control information at each checkpoint until the next checkpoint is reached. When an error occurs, the system is returned under program control to its condition at the last checkpoint. A further known approach makes use of error detection circuits which monitor the exceution of instructions. Each instruction has a threshold point after which execution may not be retried because the source data has been changed, If the error occurred before the threshold point has been reached for the particular instruction being executed, the processor is immediately stopped and a retry of that instruction is carried out. If, however, the threshold has been passed, no retry is possible.

U.S. Pat. No. 3,533,065, granted on Oct. 6, 1970 to McGilvary et al, entitled "Data Processing System Execution Retry Control" and assigned to the International Business Machines Corporation, described the use of buffers to hold information which will be necessary to reset the data processor to a previous correct state for performing a retry after occurrence of an error. Preservation of the information necessary for retry is controlled by additional fields that are added to all of the microwords in the control section which controls execution of the programmed instructions.

U.S. Pat. No. 3,533,082, granted on Oct. 6 1970 to Schnabel et al, entitled "Instruction Retry Apparatus Including Means for Restoring the Original Contents of Altered Source Operands" and assigned to International Business Machines Corporation, describes a mechanism which achieves retry of instructions by providing a back-up store for storing all source operands which may be destroyed when results are stored back to memory. When an error is detected, the control unit returns the system to the beginning of the instruction to be retried. When the point is reached during the retry at which the source operands are to be addressed, a storage data change indicator is interrogated and, if any source operand was changed during the prior erroneous execution attempt, the source operands are taken from the back-up store and set into their correct locations in the main store. U.S. Pat. No. 3,736,566, granted on May 29, 1973 to Anderson et al entitled "Central Processing Unit with Hardware Controlled Checkpoint and Retry Facilities" and assigned to International Business Machines Corporation, describes the use of temporary storage registers associated with the main store, the general purpose registers and the floating point registers for storing copies of data operands before they are modified during the processing of instructions. If the data processing system must recover to some known condition, the temporary copies can be used to restore the contents of the main storage locations, general purpose registers and floating point registers to reflect the values of the operands at the time of the known condition.

U.S. Pat. No 3,786,430, granted on Jan. 15, 1974 to Hajdu et al, entitled "Data Processing System Including a Small Auxiliary Processor for Overcoming the Effects of Faulty Hardware" and assigned to International Business Machines Corporation, describes the use of a relatively small auxiliary error processor associated with a relatively large main processor, with the error processor being operative in the case of an error to intercept the function of the main processor and to compute a correct partial or final result which is then returned to the main processor. Thus, the auxiliary error processor simulates the function of a malfunctioning unit of the main processor for enabling the main processor to produce the correct results and to continue its processing of data.

Codending U.S. patent application Ser. No. 486,043, filed on July 5, 1974 now U.S. Pat. No. 4,020,466, issued Apr. 26, 1977 in the names of Cordi and Edson, entitled "A Memory Hierarchy System with Journaling and Copyback" and assigned to the International Business Machines Corporation, describes a hierarchical memory system having two memory units on each level of the hierarchy. One of the units, called the data store, contains all the data at that level of the memory. The other unit, called the copyback store, contains all the changes that have been made in the data at that level of the memory. The data store and the copyback store on each level are on two different power supply systems so that if either power supply system fails, a complete record of the data is nevertheless available. A journal is maintained at each level for listing the addresses for the change data in the order in which they were entered into the copyback store. This journal listing enables the changed data in the copyback store to be transferred to the next lower level in the memory hierarchy in the order of its age, with the oldest changed data being transferred first.

The mechanisms described in the above-cited patents and patent application provide generally improved performance in accomplishing their desired objectives in their particular operating environments. There is, however, room for further improvement in the retrying of erroneously executed or failed instructions. And it is a primary purpose of the present invention to provide a goodly measure of such further improvement.

For a better understanding of the present invention and its various advantages and features, reference is made to the following description taken in connection with the accompanying drawings, the scope of the invention being pointed out in the appended claims.

Brief Description of the Drawings

Referring to the drawings:

FIG. 7 is a chart used in explaining the operation of the local storage copy logic of FIG. 6;

FIGS. 8a and 8b show in greater detail a representative manner of construction of the buffer storage copy logic of FIG. 3b; and FIG. 9 is a chart used in explaining the operation of the buffer storage copy logic shown in FIGS. 8a and 8b.

GENERAL DESCRIPTION OF THE SYSTEM SHOWN IN FIG. 1

Figure 1:
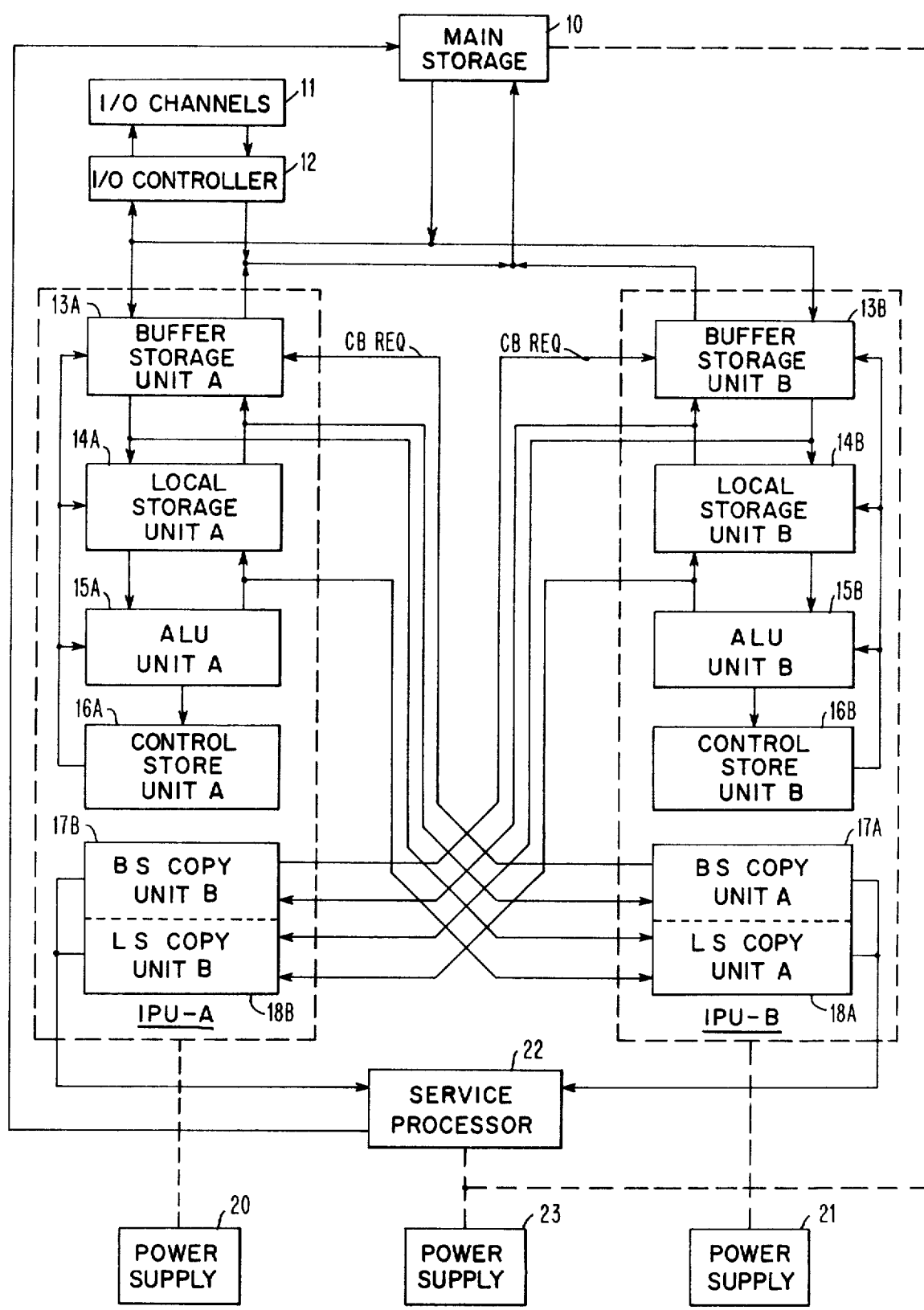
FIG. 1 is a high-level block diagram of a typical data processing system incorporating representative embodiments of retry mechanisms constructed in accordance with the present invention.

Referring to FIG. 1, the data processing system there shown includes a main store 10 and a pair of microprogrammed instruction processing units IPU-A and IPU-B which operate independently of one another and which are capable of simultaneously processing different instructions. Thus, a so-called "multiprocessing" environment is shown. Instructions and data are transferred between the main store 10 and various external peripheral devices by means of input/output (I/O) channels 11 and an input/output (I/O) controller 12. The two instruction processing units A and B are of identical construction. Instruction processing unit A includes a buffer storage unit 13A, a local storage unit 14A, an arithmetic and logic unit (ALU) 15A and a control store unit 16A. The instruction processing unit B includes a buffer storage unit 13B, a local storage unit 14B, an arithmetic and logic unit (ALU) 15B and a control store unit 16B. The instruction processing units A and B are of the microprogrammed type with the necessary microcode being located in the control store units 16A and 16B.

With respect to the main store 10, the transfer of instructions and data from such main store 10 to either of the buffer stores 13A and 13B is nondestructive in nature. The original instruction or data is maintained in the main store 10 following such a transfer. In other words, the original data is not physically transferred. Instead, the same data is written into the buffer store as is contained in and remains in the main store 10.

The main store 10 preferably includes a directory mechanism for identifying which main store data is also currently residing in one of the buffer stores 13A and 13B. This enables each of the instruction processing units to determine when a particular piece of data is subject to possible modifications by the other instruction processing unit.

A buffer storage (BS) copy unit 17A is provided for temporarily storing copies of data written into the buffer store 13A by the remainder of the instruction processing unit A. In a similar manner, a buffer storage (BS) copy unit 17B is provided for temporarily storing copies of data written into the buffer store 13B by the remainder of the instruction processing unit B. As will be seen, the storage capacity in each of the buffer copy units 17A and 17B is substantially less than the storage capacity in the corresponding buffer storage units 13A and 13B. In order to prevent loss of retry data copies in units 17A and 17B because such units have become filled up and cannot store any more new data without destorying existing data, each of the copy units 17A and 17B is constructed to send a copyback request (CB REQ.) signal to its buffer storage unit 13A or 13B, respectively, as it approaches the full condition. In the case of copy unit 17A, for example, this copyback request signal causes the buffer store 13A to write some of its IPU-modified data back into the main store 10. This, in turn, releases the corresponding space in the copy unit 17A for use by new IPU-modified data. This does not change the retry capability of the system because a copy of the previously modified data is thereafter contained in the main store 10 as well as in the buffer store 13A.

Figure 2:
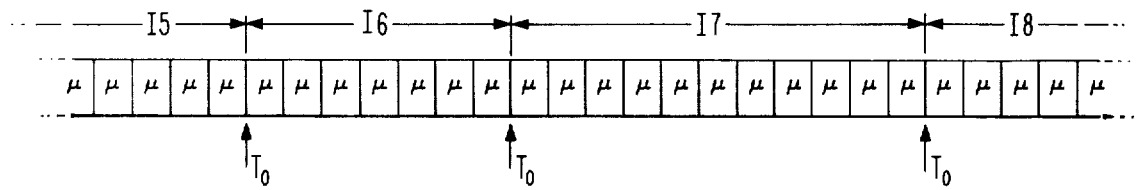
FIG. 2 depicts a typical sequence of machine instruction cycles.

A local store (LS) copy unti 18A is provided for temporarily storing copies of data written into the local store 14A by either the buffer store 13A or the ALU 15A. Similarly, a local storage (LS) copy unit 18B is provided for temporarily storing copies of data written into the local store 14B by either the buffer store 13B or the ALU 15B. The storage capacities of the local stores 14A and 14B are substantially less than those of the buffer stores 13A and 13B. Because of the smaller local store size, the storage capacities of the copy units 18A and 18B are made the same as the storage capacities of the local stores 14A and 14B, respectively. This avoids the copyback request problem associated with the buffer storage copies. FIG. 2 shows a typical sequence of machine instruction cycles. Legends 15–18 denote different machine instructions. By machine instructions is meant assembler language instructions such as, for example, add, subtract, multiply, divide, branch on condition, load, store, shift left, shift right, pack, unpack, etc. Each machine instruction is executed by a series of microinstructions or microwords issued by the control store unit. These microinstructions are indicated by the Greek letter $\mu$ in FIG. 2. In general, different numbers of microinstructions or microwords are required for the different kinds of machine instructions.

The purpose of the instruction retry mechanisms described herein is to enable the particular instruction processing unit being considered to back up and start over again at the beginning of any machine instruction cycle during which an error or failure occurs in the instruction processor unit. In FIG. 2, $T_O$ denotes the beginning point of each machine instruction cycle.

The problem with backing up and starting over is that some of the data stored in either or both of the buffer store and local store units may have been modified during the portion of the defective cycle completed before the occurrence of the defect. Thus, for any buffer store or local store storage location which is altered during the defective instruction cycle, there must be made available a copy of the data that was resident at such storage location during the preceding machine instruction cycle.

The present invention provides improved mechanisms for providing the data copies which are needed to restore the instruction processing unit to the condition existing just before the start of the defective machine instruction cycle. This is accomplished by providing two data copy storage locations for each local store or buffer store address for which a copy is needed and by alternately using first one and then the other of these two copy storage locations during succeeding machine instruction cycles in which the data at this particular local store or buffer store address is modified.

Assume, for example, that local store address location No. 28 of local store unit 14A is written into twice during instruction cycle 15, zero times during instruction cycle 16, twice during the early part of instruction cycle 17, and that an error or failure occurs during the latter part of instruction cycle 17. The local store copy unit 18A includes two copy storage locations for this local store address No. 28. The modified data occurring during instruction cycle 15 is copied at the first of these copy storage locations, the data for the second modification or write-in being overlaid over and replacing the data for the first modification or write-in. During instruction cycle 16, no data is written into local storage address No. 28 and hence no copy is made in the copy unit 18A during this 16 cycle. The two data stores occurring during the earlier part of the 17 cycle are copied into the second of the two copy storage locations for local store address No. 28. Since the assumed failure occurs during the 17 cycle, it is desired to back up and start over again from the beginning of the 17 cycle. In order to restore local store address No. 28 to its pre-17 condition, the data stored at the first of the two copy storage locations is used for this purpose. As thus seen, since two copy storage locations are provided for the local store address No. 28, one of them will always include the proper copy for retry purposes.

If no failure had occurred during the 17 cycle and data had been written into local storage address No. 28 during some later instruction cycle, say, the 19 cycle, this data would be copied into the first of the two copy storage locations for local store address No. 28. Thus, for a series of machine instruction cycles during which data is written into local store address No. 28, such data is alternatively copied into first one and then the other of the two copy store locations during alternate instruction cycles.

The same general procedure is followed for the case of buffer store 13A or 13B, with the proviso that copies are made only when the data written into the buffer store comes from the instruction processing unit. Copies are not made when the data is written into the buffer store from the main store 10 because, in this case, the original copies are still available in the main store 10. Also, there will be cases where the first writing of data into the buffer store occurs during the same instruction cycle during which the failure occurs. In such case, the retry data is obtained from the unmodified data in the main store 10.

The $T_0$ points shown in FIG. 2 constitute retry checkpoints in the sense that sufficient data copies exist for each such point for enabling a restart of the data processing operation at such point. This does not mean, however, that the system makes the necessary copies at such point. As seen from the above example, the needed retry copies may, in fact, have been made at some much earlier point in time. In fact, one of the advantages of the present invention is that the retry copies are automatically and simultaneously made at the same times that the data is written into the local store or buffer store. No interruption of the data processing operation is required to create the checkpoint copies. Also, the retry copies are made before the start of the failing cycle and hence are not influenced by any erroneous operations during such cycle.

As shown in FIG. 1, the two separate instruction processing units or IPU's A and B are operated off of two separate power supply units 20 and 21, respectively. Also, the main storage unit 10 and a service processor 22 are operated off of a third power supply unit 23. As further shown, the copy units 17A and 18A for the first instruction processing unit A are run off of the power supply unit 21 which runs the second instruction processing unit B. Conversely, the copy units 17B and 18B for the second instruction processing unit B are run off of the power supply unit 20 for the first instruction processing unit A. Among other things, this use of separate power supply units and the crossover of the power supply connections to the copy storage units considerably reduces the chances of losing the needed retry data on account of a power supply failure. In this regard, it is assumed that the storage elements in the buffer storage and local storage units are of the volatile monolithic type such that a power failure of even fairly short duration will cause a loss of the stored data.

Assume, for example, that there is a momentary failure of the power supply unit 20 sufficient to cause a destruction of the data stored in buffer storage and local storage units 13A and 14A. The system can, nevertheless, successfully recover from such a failure because the lost data is nevertheless still available in the copy storage units 17A and 18A and the main storage unit 10, these units being operated off of separate power supply units and hence being unaffected by the failure of the power supply unit 20. In particular, the local storage copy unit 18A includes a complete copy of the data that was in the local storage unit 14A. The buffer storage copy unit 17A includes copies of all IPU-modified data in the buffer storage unit 13A that has not yet been copied back to the main store 10. The main store 10 includes copies of all unmodified data in the buffer storage unit 13A, as well as copies of any modified data that has previously been copied back into such main store 10. Thus the data processing system of FIG. 1 can recover from rather massive, as well as relatively minor, hardware type failures in one of the instruction processing units A and B.

In the event of an error or failure in one of the instruction processing units, say, the first unit A, then this instruction processing unit A immediately stops operation and awaits further instruction. At the same time, it sends a retry request signal to the service processor 22. The service processor 22 then commences to read out all of the copy data stored in the copy storage units 17A and 18A and to write it into its own internal storage unit. The service processor 22 thereafter reconstructs in the main store 10 a replica of the data existing in local store 14A at the end of the machine instruction cycle immediately preceding the instruction cycle during which the failure occurred. This is accomplished by selecting the proper one of the two data copies for each local storage address and sending the selected data copies to the main store 10. The selection is made by examining certain status bits for each local storage address, such status bits being read by the service processor 22 at the same time as the copies are read. This will be described in greater detail hereinafter. The local storage replica is created in the main store 10 at a fixed area therein which is specifically set aside for this purpose.

After creation of the local store replica, the service processor 22 writes the buffer storage data changes into the main store 10. This is accomplished by looking at each set of buffer store copies transferred from the copy store 17A, selecting the proper one of the two possible copies for each address and using the selected copy to modify the original data residing in main store 10 for such address. In other words, the main store 10 is updated to take into account the various data changes that have occurred up to the beginning of the defective instruction cycle. At this time, a directory table located in the buffer store 13A is updated to show that this data is no longer valid in the buffer store 13A. Also, the directory table in the main store 10 is updated to show that this data is effectively no longer residing in the buffer store 13A.

After the main store 10 is updated in accordance with the buffer store copies, the service processor 22 proceeds to reinitialize the failed instruction processing unit A. If necessary, this includes performing an initial microprogram load (IMPL) of the control store unit 16A in the instruction processing unit A. The local storage unit 14A is then reloaded with the local storage replica created in the main store 10. Following this reload of the local store, the service processor 22 instructs the instruction processing unit A to restart the data processing action at the beginning of the defective instruction cycle. If the retry is successful, the instruction processing unit A proceeds in the normal manner. If it fails, the retry may be repeated a fixed number of times, after which the retry action is terminated and some further alternative action is taken which, at worst, would consist of signaling the machine operator of the failure.

It is noted that in the foregoing recovery procedure the buffer storage unit 13A is not initially reloaded or otehwise restored to its prefailure condition. Instead, the buffer storage copy data obtained from copy unit 17A is used to update the main store 10. Thereafter, the data required by buffer store 13A is merely allowed to be paged back into the buffer store 13A in the normal manner as it is needed.

The above-described recovery procedure was for the case where the retry is performed on the same instruction processing unit which experienced the failure. Thus, this invention is applicable to systems having only a single instruction processing unit. As an alternative for the illustrated two IPU case, however, the retry may instead be performed by the other instruction processing unit B which, in the assumed case, is the one which did not fail. This alternate IPU retry might be performed, for example, in the situation where the failed instruction processing unit does not recover after a selected fixed number of retries. The alternate IPU retry is accomplished by transferring the recreated local storage replica in the main store 10 to the alternate IPU, in this case the IPU B, and by having the service processor 22 instruct this alternate IPU to perform the retry.

The service processor 22 is a relatively small-size microprogrammed data processor having its own internal storage, arithmetic and control units. A small processor suitable for use as the service processor 22 is the IBM System/360 Model 20 data processor manufactured and marketed by International Business Machines Corporation of Armonk, New York. This Model 20 processor is described in the following IBM publications which may be obtained through any IBM branch office throughout the world: "IBM System/360 Model 20 Functional Characteristics", Order No. GA26-5847, tenth edition dated March 1974; "IBM Model 2020 Processing Unit Field Engineering Theory of Operation Manual", Order No. SY26-5909; and "IBM Model 2020 Processing Unit Maintenance Diagram Manuals" (two volumes), Volume 1 having Order No. SY33-1024 and Volume 2 having Order No. SY33-1042. Another data processor suitable for use as the service processor 22 is the IBM System7 data processor manufactured and marketed by the International Business Machines Corporation of Armonk, New york. This System/7 processor is described in the following IBM publications: "IBM System/7 Functional Characteristics", Order No. GA34-0003, sixth edition dated 1974; and "IBM System/7 Theory-Maintenance Manual", Order No. SY34-0029, Fourth Edition dated Oct. 1973. These cited publications for the System/360 Model 20 and the System/7 machines are hereby incorporated in this application by this reference thereto.

It is further noted that both the IBM System/370 Model 115 data processor and the IBM System/370 Model 125 data processor each include an auxiliary microprogrammed service processor which, with modification, could be used as the service processor 22 shown in FIG. 1. Both of these System/370 machines are manufactured and marketed by the International Business Machines Corporation of Armonk, New York.

Figure 3A:
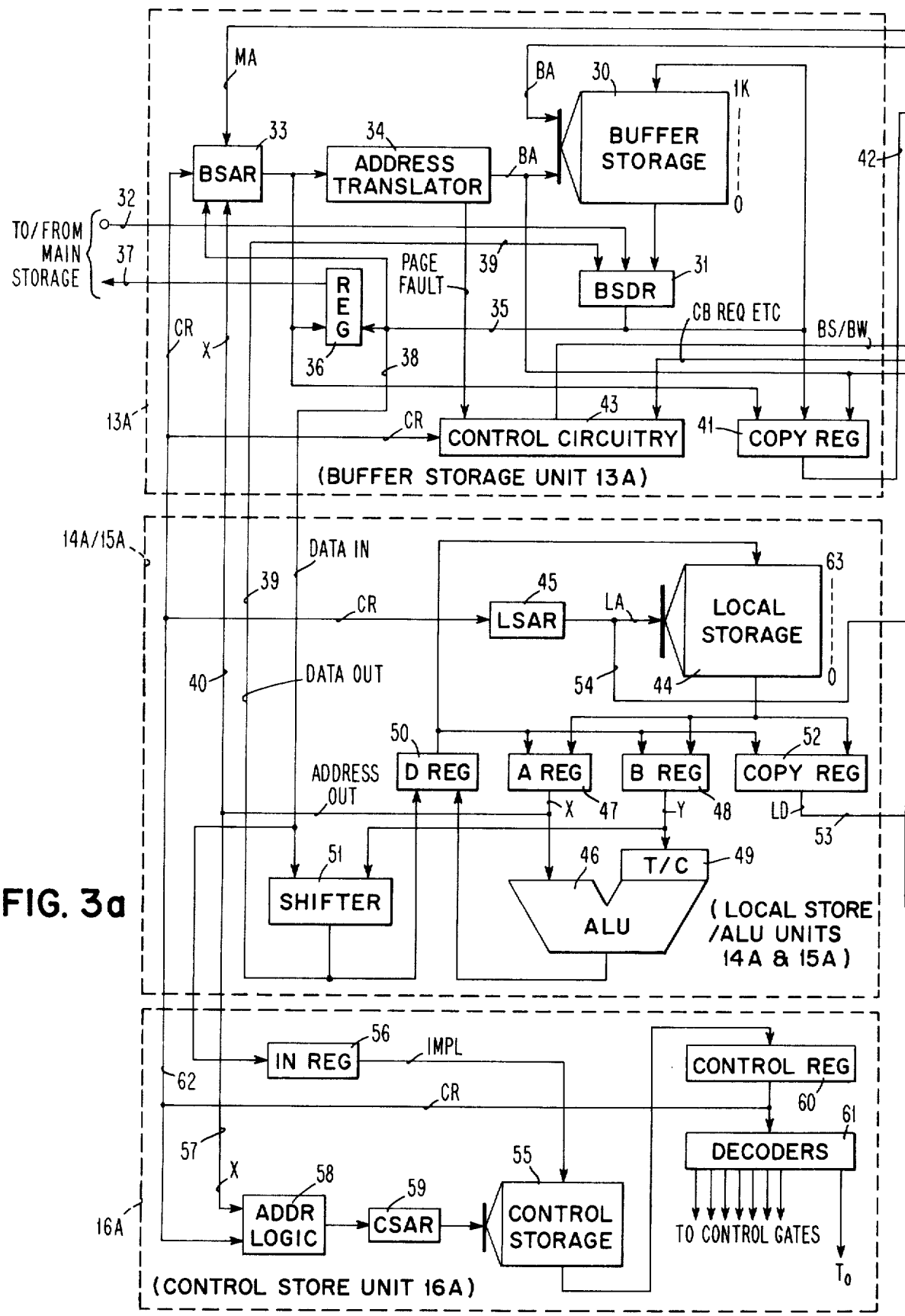
FIGS. 3a and 3b describe in greater detail selected portions of the data processing system of FIG. 1.
Figure 3B:
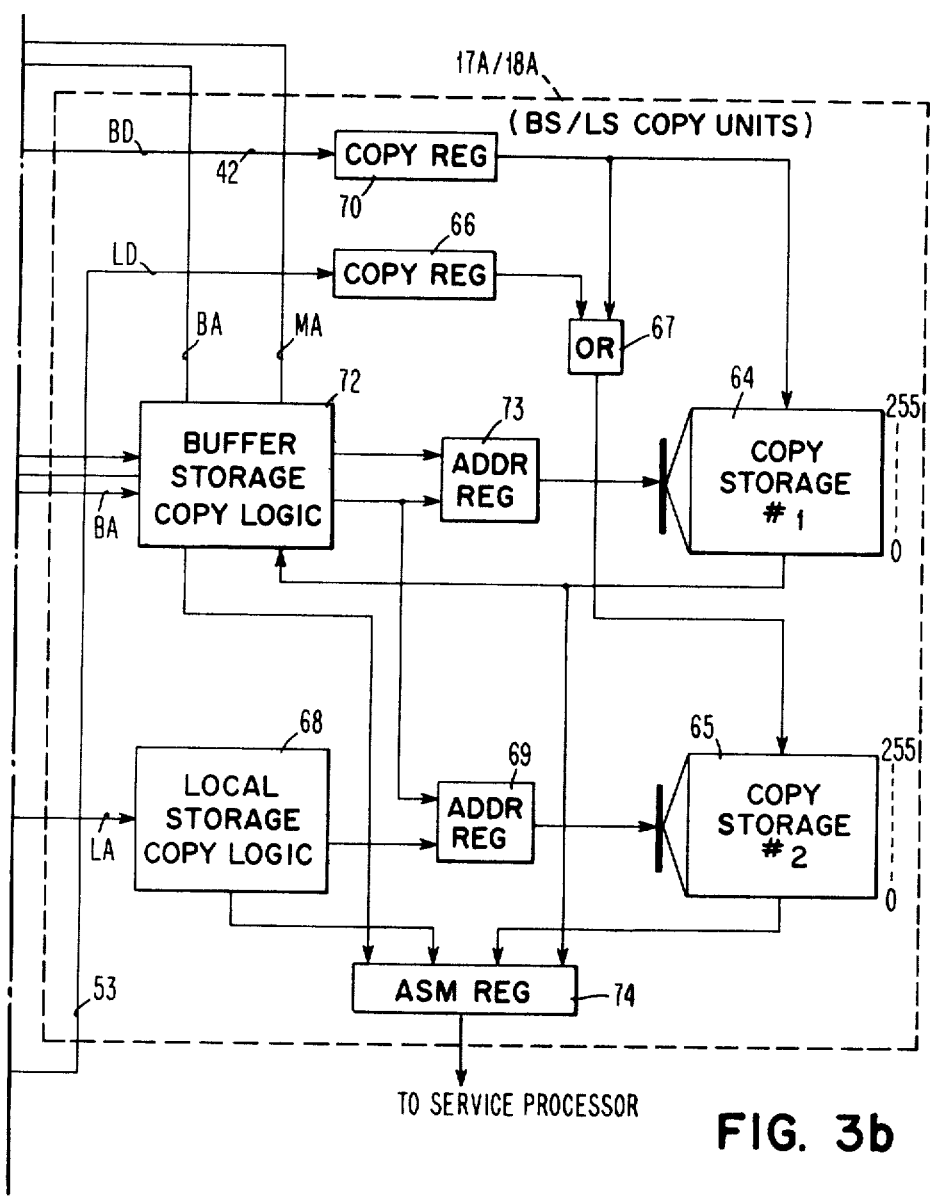

DESCRIPTION OF UNITS SHOWN IN DETAIL IN FIGS. 3a AND 3b

Referring now to FIGS. 3a and 3b, there is shown in greater detail the manner of construction of the buffer storage unit 13A, the local storage unit 14A, the ALU unit 15A, the control store unit 16A, and the buffer storage and local storage copy units 17A and 18A of FIG. 1. Units 13A-16A are in FIG. 3a and copy units 17A and 18A are in FIG. 3b. Though not shown, it is to be understood that the various B units 13B-18B are constructed in exactly the same manner as the A units 13A-18A shown in FIGS. 3a and 3b.

It is initially noted that each of the units shown in FIGS. 3a and 3b includes one or more storage arrays. For sake of example only, typical values will be given for the number of addressable multibit storage locations in these arrays. This is done to simplify the explanation and understanding of these units and it is to be clearly understood that the invention is in no way to be limited to these particular values.

As seen in FIG. 3a, the buffer storage unit 13A includes a buffer storage array 30 having 1024 (binary 1K) addressable multibit storage locations. Data is written into and read out of the buffer array 30 by means of a buffer storage data register (BSDR) 31. Data (including instructions) is supplied by the main store 10 (FIG. 1) to the buffer storage unit 13A by way of data bus 32 (FIG. 3a) which runs to BSDER 31. Each data item includes or is accompanied by address data identifying its address location in main store 10. This main store address data is supplied by BSDR 31 to a buffer storage address register 33. The main store address in BSAR 33 is converted to a buffer store address by address translator 34. The resulting buffer address then accesses the buffer storage array 30 and the data in BSDR 31 is written into the array 30 at the designated buffer address.

Address translator 34 may be of the type used in the various larger model IBM System/370 machines for translating virtual (external) storage addresses into real (internal) storage addresses. In this regard, the main store 10 is like the virtual or external store and the buffer store 30 is like the real or internal store. Suitable forms of address translation circuitry for this purpose are described in the following United States patents assigned to International Business Machines Corporation: U.S. Pat. No. 3,761,881, granted Sept. 25, 1973 to Anderson et al and entitled "Translation Storage Scheme for Virtual Memory System", and U.S. Pat. No. 3,781,808, granted Dec. 25, 1973 to Ahearn et al and entitled "Virtual Memory System". The Ahearn et al patent describes the construction and use of a so-called "directory lookaside table" (DLAT) for use in performing the translation. The address translator 34 herein is preferably of this DLAT type.

Data stored in the buffer array 30 may be copied back to the main store 10 by writing it into the BSDR 31 and then transferring it by way of data bus 35, an output register 36 and a data bus 37 to the main store 10.

The buffer storage unit 13A communicates with the local storage and ALU units 14A and 15A by way of data buses 35, 38, 39 and 40. Data buses 35 and 38 are used to supply data from BSDR 31 to the local storeALU units 14A and 15A. Data bus 39 is used to supply data from the local storeALU units 14A and 15A to the BSDR 31. Data bus 40 is used to supply address data from the local store/ALU units 14A and 15A to the BSAR 33.

The buffer storage unit 13A supplies data and address values to the buffer store/local store (BS/LS) copy units 17A and 18A by means of a copy register 41 and a data bus 42.

The buffer storage unit 13A includes its own internal hardwired control circuitry 43 for controlling the transfer of data into and out of the buffer storage array 30 and for communicating various status signals and request signals back and forth between the buffer unit 13A and the main store 10 and the BS/LS copy units 17A and 18A. This control circuitry 43 may, for example, take the form of the buffer store control circuitry used in the storage control unit of the IBM System360 Model 195 data processor manufactured and marketed by the International Business Machines Corporation of Armonk, New York.

The local storeALU units 14A and 15A include a local storage array 44 having, for example, 64 multibit addressable storage locations. A particular one of these addressable locations is selected by placing the appropriate local storage address in a local storage address register (LSAR) 45. Arithmetic and logic operations are performed by an arithmetic and logic unit (ALU) 46 which can receive input data by way of an A register 47 and a B register 48, the latter being connected to the ALU 46 by way of truecomplement (T/C) gates 49. Output or result data from ALU 46 is sent to a destination register 50 from whence it may be sent to either the local storage array 44 or the A and B registers 47 and 48. The A and B registers 47 and 48 may also obtain data from the local store array 44.

Data is received from the buffer storage unit 13A by way of data bus 38, a data shifter 51 and the destination register 50. Data is sent to the buffer storage unit 13A by way of the B register 48, the shifter 51 and the data bus 39. Main store address information is sent to the buffer store 13A by way of the A register 47 and the data bus 40.

Any data written into the local storage array 44 is also sent to the copy units 17A and 18A by means of a copy register 52 and a data bus 53. The copy register 52 receives data from both the local storage array 44 and the destination register 50. In this regard, it sometimes functions to assemble both modified and unmodified data bits for a given local storage address so that, even though the ALU 46 modifies only some of the bits, the complete set of data for that address can be sent to the copy units 17A and 18A. In other words, any time any data is written into the local storage array 44, the complete line of data for that address is sent to the copy units 17A and 18A. The local store addresses in LSAR 45 are also sent to the copy units 17A and 18A, this being done by way of address but 54.

The operation of the local store/ALU units 14A and 15A is controlled by the control store unit 16A. This control store unit 16A includes a control storage array 55 into which is loaded the microcode or microprograms which enable the local store/ALU units 14A and 15A to carry out or execute the various possible machine instructions which may be sent to the local store/ALU units 14A and 15A. The microcode is loaded into the control store array 55 at power on time when the data processing system is first started up and remains in the array 55 until such time as the system may be shut down. This is accomplished by way of register 56 and is known as an "initial microprogram load" (IMPL).

When a new machine instruction is to be executed by the local store/ALU units 14A/15A, the op code for such instruction is sent by way of A register 47 and data bus 57 to address logic 58 in the control store unit 16A. In response thereto, such logic 58 supplies the proper address to a control store address register (CSAR) 59 so as to select the starting control store address for the particular microprogram which is designed to execute that particular machine instruction. This accesses the first microword for that instruction and such microword is then set into a control register 60. The microword supplied to the control register 60, among other things, includes the necessary address information for obtaining the next microword. This address information is sent to the address logic 58 to, in turn, cause the next microword to be read into the control register 60. This process is repetitive and sequential in nature and the various microwords making up the particular microprogram in question are read into the control register 60 one after the other in a sequential manner.

As each microword is read into the control register 60, the control fields therein are supplied to decoders 61 to produce the control signals which control the various data bus control gates (not shown) in the local store/ALU units 14A/15A. The control register 60 also sends address information to the LSAR 45 by way of address bus 62 for purposes of controlling the addressing of the local storage array 44. This enables the proper data to be read into and out of the array 44 at the proper moments during the execution of the instruction.

The construction and operation of microprogram type control store units is well known in the art and will not be discussed at greater length herein. Further information concerning same may be obtained from the following United States patents assigned to International Business Machines Corporation: U.S. Pat. No. 3,400,371, granted on Sept. 3, 1968 to Amdahl et al and entitled "Data Processing System"; and U.S. Pat. No. 3,651,476, granted on Mar. 21, 1972 to Metz et al and entitled "Processor With Improved Controls for Selecting an Operand from a Local Storage Unit, and ALU Output Register or Both". The Amdahl et al patent is the basic patent on the microprogramming of the IBM System/360 machines. The Metz et al patent describes the IBM System/370 Model 145 machine and its microprogramming. The descriptions set forth in these cited patents is hereby incorporated into this application by this reference thereto.

Figure 4:
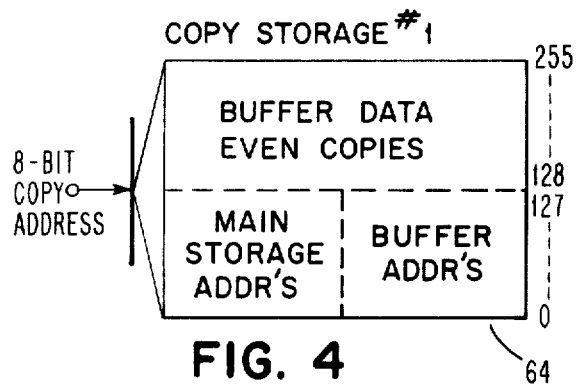
FIGS. 4 and 5 show the manner of allocation of storage space in the copy storage units of FIG. 3b.
Figure 5:
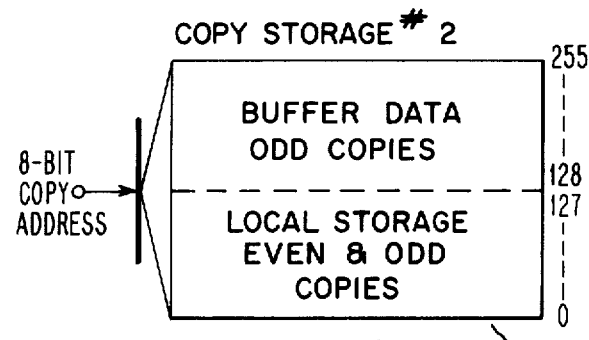

Considering now the buffer storage and local storage copy units 17A and 18A (FIG. 3b), it is seen that the representative embodiment to be described herein makes use of a pair of copy storage arrays 64 and 65. Each of these arrays has 256 addressable multibit storage locations. The manner in which the storage areas within these two arrays 64 and 65 is allocated to the different types of data to be copied is shown in FIGS. 4 and 5. As seen in FIG. 5, the local store copies are stored in the lower half (addresses 0–127) of the array 65. As previously indicated, two copy storage locations are provided for each local store address. For this reason, the local storage area in array 65 includes 128 addressable storage locations, which is twice the number of storage locations in the local storage array 44. The two copy locations for each local store address are distinguished on an even and odd basis. In particular, for each local store address value, there is one even-numbered and one odd-numbered line which is assigned to it in the copy array 65. For example, lines 0 and 1 in array 65 represent the two copy locations for local store address 0, lines 2 and 3 in array 65 are the two copy locations for local store address 1, lines 4 and 5 in the array 65 are the two copy locations for local store address 2, etc. Thus, an even-numbered line and its adjacent higher-numbered odd line form the two copy storage locations for each local store address.

The remainder of the copy array 65 and all of copy array 64 are used for buffer store data and address copies. In the illustrated embodiment, provision is made for handling the information for up to 128 different buffer store addresses at any given instant. For each buffer store address, three copy storage locations are required, two for holding the two data copies and one for holding the necessary address information. The various "even" data copies for the different buffer addresses are placed in the upper half of the array 64 and the various "odd" data copies are placed in the upper half of copy array 65. The address information is placed in the lower half of copy array 64. In particular, copy locations 128 (= 128 + 0) in both arrays and copy location O in array 64 are used to service a first buffer storage address, locations 129 (= 128 + 1) in each array and location 1 in array 64 are used to service a second buffer storage address, and so forth, with up to 128 different buffer storage addresses being accommodated at any given instant.

As mentioned, the buffer storage array 30 has 1024 addressable storage locations. Thus, there are eight times as many buffer storage addresses as can be handled by the copy storage arrays 64 and 65 at any given moment. Consequently, a mechanism is provided for assigning the different 128 three-location copy storage sets to the different buffer store addresses as needed and for releasing previously assigned sets when no longer needed. The more or less random manner in which the different buffer storage locations will be addressed means that the corresponding buffer data copies in the copy arrays 64 and 65 will be arranged in a more or less random order in terms of their buffer address values. This is the reason it is necessary to also copy the buffer address into copy storage along with the buffer data.

As indicated in FIGS. 3a and 3b, the local storage data to be copied into copy storage is supplied to the copy array 65 by way of a copy register 66 and an OR circuit 67. At the same time, the local storage address for the data is supplied to local storage copy logic 68 which, in turn, supplies the proper address to an address register 69 for purposes of addressing the copy array 65.

The buffer storage data and address information to be copied into copy storage is supplied to the copy array 64 by way of a copy register 70 and to the copy array 65 by means of the copy register 70 and the OR circuit 67. The addressing of the copy arrays 64 and 65 for storing buffer data and buffer addresses is accomplished by sending the buffer store address to buffer storage copy logic 72. At the appropriate times, the buffer copy logic 72 supplies the proper addresses to address registers 69 and 73 for purposes of addressing the copy arrays 64 and 65. The buffer data and the buffer address information are written into the copy arrays 64 and 65 in two successive steps, with, for example, the address information being written first and the data second. As will be seen, buffer logic 72 includes the necessary allocation mechanism for deciding which set of copy storage locations to use for any given buffer store address.

An assembler register 74 is included in the copy unit 17A/18A for enabling the data copies and various status bits to be transferred to the service processor 22 following the occurrence of an error or failure in the IPU units 13A–16A. For this reason, appropriate buses and conductors are provided for transferring data copies from copy arrays 64 and 65 and status bits from buffer copy logic 72 and local store copy logic 68 to the assembler register 74. The output bus from the assembler register 74 runs to the input of the service processor 22 shown in FIG. 1.

DESCRIPTION OF FIG. 6 LOCAL STORAGE COPY LOGIC

Figure 6:
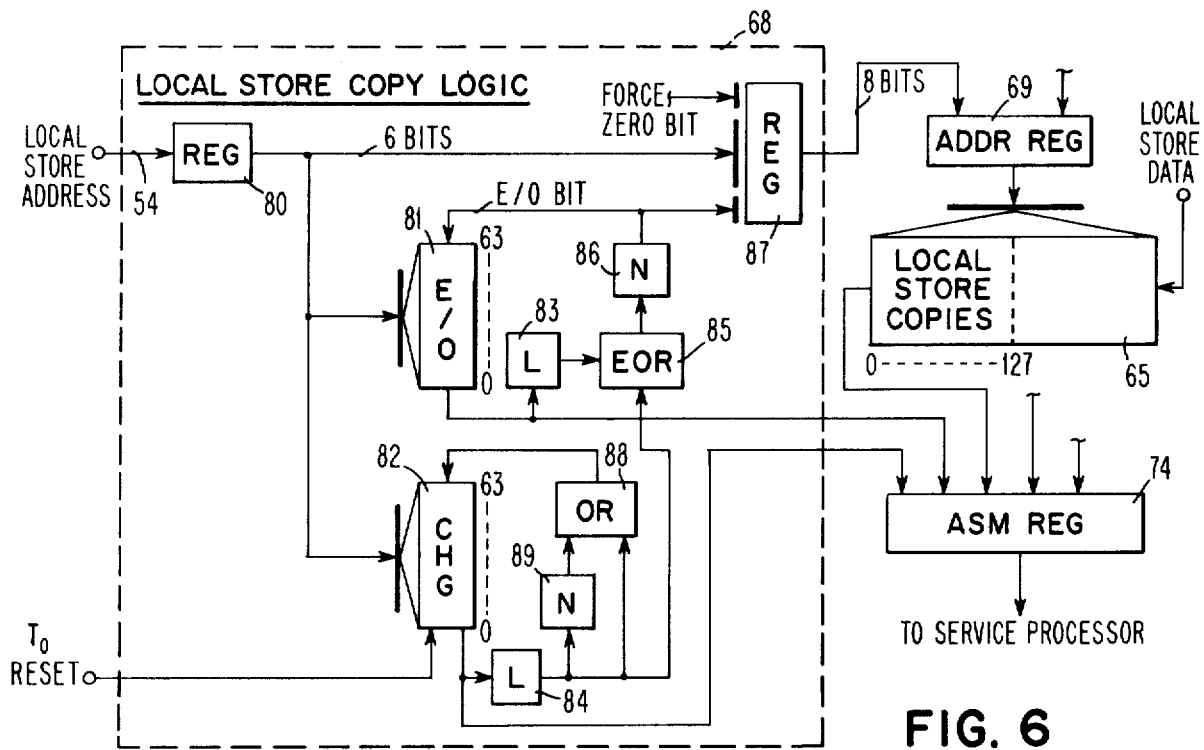
FIG. 6 shows in greater detail a representative manner of construction of the local storage copy logic of FIG. 3b.

Referring now to FIG. 6, there is shown a representative form of construction for the local storage copy logic 68 of FIG. 3b. As indicated in FIG. 6, the local storage address from LSAR 45 is set into an input register 80. As thus situated, this local store address is used to access in parallel an even/odd (E/O) bit storage array 81 and a change bit storage array 82. Each of these arrays 81 and 82 has 64 addressable one-bit storage locations which have a one-to-one correspondence with the 64 addressable locations in local storage array 44. The E/O bit obtained from array 81 together with the change bit obtained from array 82 determines whether the local store data will be copied into the even-numbered line or the odd-numbered line in the copy storage array 65. An E/O bit value of zero selects the even line and an E/O bit value of one selects the odd line. The change bit obtained from the array 82 tells whether or not data has previously been written into the same address location in local store 44 during this same machine instruction cycle. All 64 change bits in the array 82 are reset to zero at the beginning of each machine instruction cycle by means of a $T_O$ reset signal obtained from the control store unit 16A. Thus, a change bit value of zero indicates that the particular local store address in question has not been written into during the current machine instruction cycle. Conversely, a change bit value of one indicates that there has been at least one previous writing of data into the local store 44 at this address.

After the arrays 81 and 82 have been accessed by the address in register 80, the selected E/O bit is latched up in a latch circuit 83 and the selected change bit is latched up in a latch circuit 84. The change bit in the latch 84 is then used in combination with the E/O bit in latch 83 to determine the E/O value to be used for the local store address then present in the register 80. The E/O value in the latch 83 is, of course, the value that was used the last previous time this particular local store address was written into. The algorithm for determining the new E/O bit value is as follows:

1. If the change bit is off (zero), then invert the previous E/O value to obtain the new E/O value.

2. If the change bit is on (one), use the previous E/O value as the new E/O value.

This algorithm is performed by the EXCLUSIVE OR circuit 85 and the NOT circuit 86. The new E/O bit value at the output of NOT circuit 86 is supplied to the lowest order position of an assembler register 87 and is also written back into the E/O array 81 to become the previous value the next time the same local store address is accessed.

After the change bit array 82 is accessed and the change bit value set into the latch 84, the selected change bit in array 82 is always turned on (set to one). In other words, the accessed change bit is set to one on the first access and remains at this one value until the end of the current machine instruction cycle, at which time it is reset to zero by the $T_O$ signal. This setting of the change bit to one at the first access can be accomplished in various ways. In FIG. 6, it is accomplished by means of OR circuit 88 and NOT circuit 89 which function to always write a one back into the selected bit position in the array 82.

The assembler register 87 supplies to the copy array address register 69 the eight-bit address which is needed to address the copy array 65. As indicated, a zero bit is forced into the highest order bit position in the assembler register 87. This causes the address register 69 to address only the lower half of the copy array 65 which is, of course, the desired result. The basic sixbit address obtained from register 80 causes the address register 69 to select a particular even/odd line pair in the copy array 65. The E/O bit then chooses between the even and odd lines in the selected pair. After the proper line has been selected, the local store data then residing in the copy register 66 (FIG. 3b) is written into the copy array 65.

The table shown in FIG. 7 summarizes the various possible conditions of the E/O and change bits both before and after either a local storage copy operation or a $T_O$ reset operation. The right-hand column in the table gives the location of the proper copy to use for retry or recovery purposes.

After an error or failure in the instruction processing unit A, all 128 local storage copies in the array 65 are transferred to the service processor 22 by way of the assembler register 74. The entire contents of both the E/O bit array 81 and the change bit array 82 are also transferred to the service processor 22. The service processor 22 thereafter operates to reconstruct the correct 64 line replica to be loaded back into the local storage array 44 for retry purposes. This reconstruction is accomplished by examining the change bits and E/O bits to determine which of the even and odd copies to choose for the different local store addresses in the replica. For any given local store address, if the change bit is on (one), the opposite of the location indicated by the corresponding E/O bit is used. If, on the other hand, the change bit is off (zero), then the location indicated by the value of the corresponding E/O bit is used.

Figure 8B:
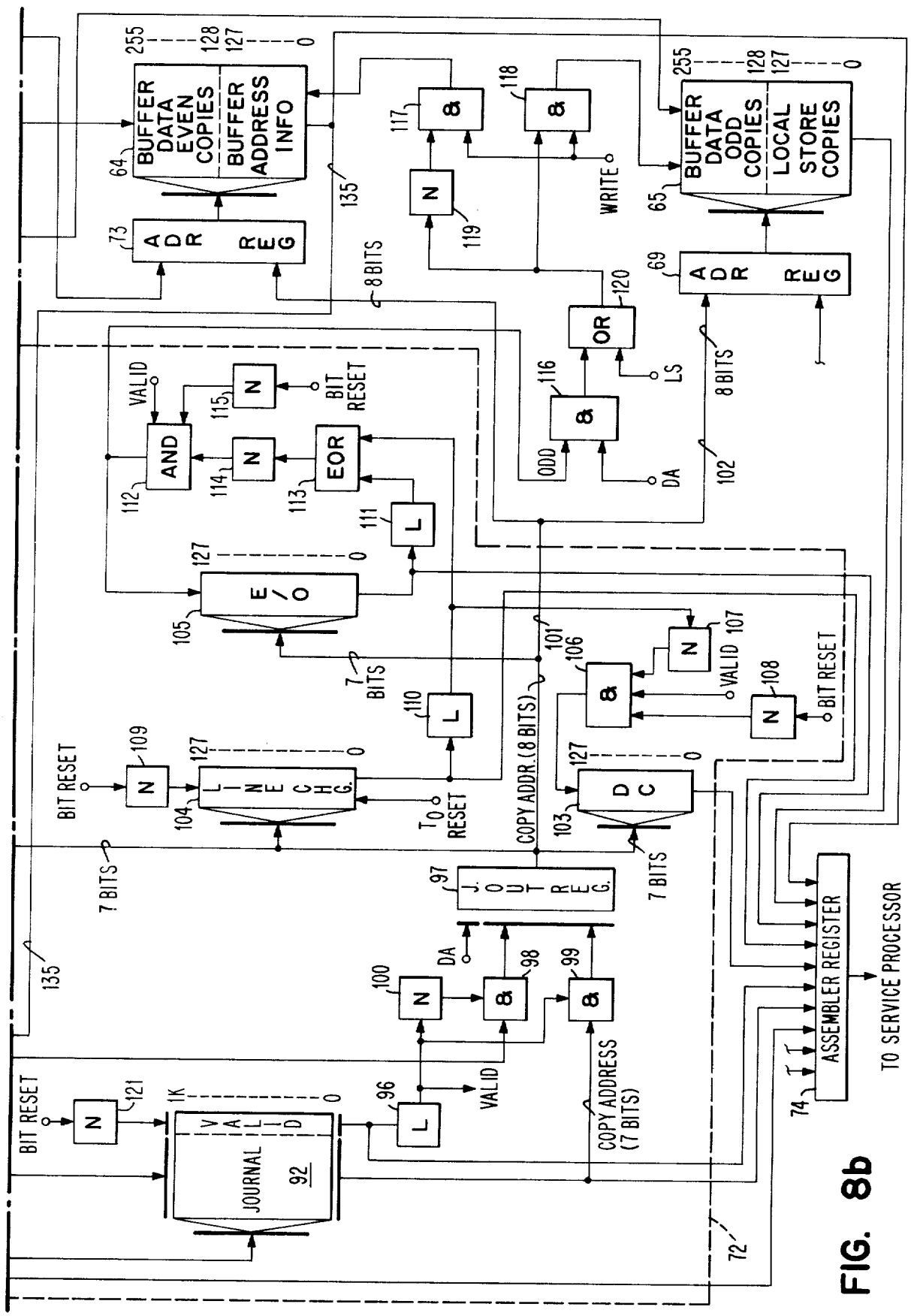

DESCRIPTION OF FIGS. 8a AND 8b BUFFER STORAGE COPY LOGIC

Referring now to FIGS. 8a and 8b, there is shown a representative manner of construction for the buffer storage copy logic 72 of FIG. 3b. The various alphabetic legends used in these figures have the following meanings:

BA = Buffer store address
BD = Buffer data and addresses
BS = Buffer store
BW = Buffer working for copyback
CB = Copyback
CP = Chect point
DA = Buffer data (and not address)
L = Latch circuit
LD = Local store data
LS = Local store
MA = Main store address
N = Not circuit The buffer store address appearing at the output of address translator 34 (FIG. 3a) is supplied to a jounal address register 90 (FIG. 8a) by way of address bus 91. Register 90 accesses a journal storage array 92 (FIG. 8b). Journal 92 provides the correlation and bookkeeping between the buffer store address values and the copy store address values. Journal 92 has the same number of addressable storage locations as does the buffer storage array 30, there being 1024 (binary 1K) addressable locations in each case. Also, there is a one-to-one correspondence between addresses for the buffer store 30 and addresses for the journal 92. Each storage location or line in the journal 92 has a width of eight bits. The first seven bits are used to record copy store addresses and the eighth bit is a "valid" status bit. The valid bit at any given journal address is turned on (value of one) when the same buffer store address has at least one valid copy entered in the copy store 64/65. The valid bit is turned off (value of zero) when the buffer store address does not have any valid copies in either of the copy stores 64 and 65.

Operating in conjunction with the journal 92 is a storage array 93 called "free space list". The free space list array 93 has 128 addressable storage locations, each having a width of seven bits. Initially, when the data processing system is first powered on, the free space list array 93 is initialized to contain the 128 possible basic copy store addresses listed in ascending numerical order from bottom to top. The "basic" address is the seven lower order address bits and is the same for each of the three copy locations (even data, odd data and address information) used for any given buffer store address. A next free space (NFS) counter 94 points to the location on free list 93 which is used to provide the copy store address at which the next buffer store copy needing a copy address should be placed. Counter 94 accesses the list 93 by way of OR circuit 95. The counter 94 is initially set to zero. It is incremented by one count shortly after each new copy storage address is handed out. Thus, the address values on the free space list 93 are given out one at a time as data from different previously uncopied buffer store addresses is copied into copy stores 64 and 65. If a given buffer store address already has a still valid copy store address assigned to it, then, of course, no new or further copy address is given to it. The copy addresses from the free space list 93 tell where the buffer store data is to be stored in the copy stores 64 and 65. When an address from the free space list 93 is used for this purpose, it is also recorded in the journal 92 at the address location in the journal which is the same as the buffer store address. In this manner, the copy addresses in the journal 92 tell where the buffer store data is located in the copy stores 64 and 65.

The first steps to be followed when a new buffer store address is set into the journal address register 90 are to access the free space list 93 (per NFS counter 94) and the journal 92 (per address in register 90) and to set the accessed valid bit from journal 92 into a latch circuit 96.

This valid bit in latch 96 is then examined to determine what to do next. If the valid bit is zero (meaning no copy address is currently assigned to this buffer store address), then the copy address provided by the free space list 93 is set into a journal output register 97 by way of AND gates 98. If, on the other hand, the valid bit has a value of one, this means that a valid copy address is presently assigned to this buffer store address and that the assigned copy address is in the journal 92. Thus, if the valid bit is on, the copy address is taken from the journal 92 and set into the journal output register 97 by way of AND gates 99. As is seen in the drawing, these AND gates 98 and 99 which do the selecting between free list 93 and journal 92 are controlled by the valid bit value in latch 96, the AND gates 98 being controlled by way of NOT circuit 100.

The address set into the journal output register 97 is used to address or access the copy stores 64 and 65. It is supplied to copy store 64 by way of an eight-bit address bus 101 and the copy store address register 73. It is supplied to the copy store 65 by way of eight-bit address buses 101 and 102 and the copy store address register 69.

The eighth or highest order bit in the journal output register 97 is forced by a control signal denoted as DA. This eighth bit determines whether the address in register 97 will address the upper half or the lower half of the copy arrays 64 and 65. When buffer data and not address information is to be copied, it is forced to a value of one so as to address the upper halves of the copy arrays 64 and 65. When buffer address information, as opposed to buffer data, is to be stored, this eighth bit is forced to zero to cause the lower half of the copy array 64 to be addressed. Thus, the control signal DA has a value of one when data is to be copied and a value of zero when address information is to be copied.

The lower order seven bits in the journal output register 97 are also used to access a double copy (DC) storage array 103, a line change storage array 104 and an even/odd (E/O) bit storage array 105. Each of arrays 103-105 has 128 addressable one-bit storage locations. Each double copy bit in array 103 tells whether or not the corresponding buffer store address has both an even data copy and an odd data copy in the copy stores 64 and 65. When it does, the DC bit has a value of one, and when it doesn't, it has a value of zero. This status information is needed for recovery purposes. The DC bit is set to one when the second of the even and odd copies is written into the copy stores 64 and 65. This is accomplished by AND circuit 106 and NOT circuit 107. If the valid bit is on (one data copy already in copy store) and the line change bit is off (a different machine instruction cycle), then the AND circuit 106 supplies a one value which is written into the double copy array 103 during the next ensuing write-in to this same copy store basic address. At this time, a bit reset signal has a value of zero, causing a NOT circuit 108 to supply a further one value to the AND circuit 106. As will be seen, the double copy bit is reset to zero when the corresponding buffer store data is copied back from the buffer store 30 to the main store 10, at which time the corresponding copy space in copy arrays 64 and 65 is no longer needed.

Each line change bit in array 104 tells whether or not the corresponding buffer store address has had data written into it during the current machine instruction cycle. A zero value indicates that no data has been written yet during this cycle and a one value indicates the converse, namely, that there has been at least one previous writing of data into the buffer store address during the current cycle. All 128 locations in the line change array 104 are reset to zero at the beginning of each new machine instruction cycle by means of the $T_0$ reset signal. Thereafter, each bit is set to one when it is accessed. This is accomplished by writing in the one value normally appearing at the output of NOT circuit 109. This is done after the accessed line change bit is set into a latch 110. A given line change bit is also reset to zero by the bit reset signal upon completion of the copyback of the corresponding buffer store data from the buffer store 30 to the main store 10.

The E/O bit array 105 is used to control the placement of the buffer data copies into either the even copy area in copy array 64 or the odd copy area in copy array 65. An E/O value of zero denotes the even copy array 64 and an E/O value of one denotes the odd copy array 65. Initially, all E/O bits in the array 105 are set to zero so that the first buffer data copy will, in each case, be placed in the even copy array 64. When the E/O array 105 is initially accessed, the read out bit value is set into a latch circuit 111.

The new E/O bit value to be used for the new data to be stored is dependent on both the valid bit value in the latch 96 and the line change bit value in the latch 110. These latched values represent the conditions existing before the copy store write-in which is about to be made. If the valid bit is off (zero), then the new E/O bit value is set at zero by an AND circuit 112. A valid bit value of zero indicates that there is no current valid copy and hence that the about-to-be-written copy is the first copy and hence should be placed in the even copy area in array 64. If, on the other hand, the valid bit has a value of one, then the value of the change bit comes into play. In this latter case, the algorithm is the same as was used for the E/O bit in the local store copy logic 68. In particular, if the change bit has a value of zero, then the new E/O value should be made the opposite of the previous E/O value (in latch 111). If, on the other hand, the change bit has a value of one, then the new E/O bit value is made the same as the previous E/O bit value. These desired results are obtained by means of an EXCLUSIVE OR circuit 113 and a NOT circuit 114. The bit reset signal is normally zero so that the output of a NOT circuit 115 is normally a one value. After the new buffer data is written into the proper one of buffer arrays 64 and 65, the new E/O value is written into the E/O array 105 at the selected copy store address. As will be seen, the E/O bit at any given location in the array 105 is reset to zero after completion of the copyback of the corresponding buffer store data from the buffer store 30 to the main store 10. This reset to zero is accomplished by the bit reset signal, NOT circuit 115 and AND circuit 112.

As indicated, the even/odd signal appearing at the output of AND circuit 112 is used to control the selection between copy arrays 64 and 65. To this end, it is supplied to an AND circuit 116 to which is also supplied the data versus address control signal DA. A common write command signal is supplied to AND circuits 117 and 118, the outputs of which cause the writing of data into the respective ones of the copy arrays 64 and 65. As indicated by the presence of NOT circuit 119, one or the other but not both of the arrays 64 and 65 will end up receiving the write command. The array to be selected is controlled by the signal at the output of OR circuit 120 which receives, as a first input thereof, a local store (LS) signal which has a one value when a local store copy is to be made and a zero value when it is not a local store copy. Thus, any time a local store copy is to be made, the output of OR circuit 120 is at the one level and the array 65 is selected for writing purposes.

If the local store signal LS is zero, then the output of OR circuit 120 is determined by the output of AND circuit 116. If buffer address information is to be copied, then the DA signal goes to zero and the output of OR circuit 120 is zero. This is inverted to a one by NOT circuit 119 to select the array 64 for write-in purposes. If buffer data is to be copied, then the DA signal is one and the array selection is determined by the new E/O bit value at the output of AND circuit 112. If the E/O value is zero (even), then the even array 64 is selected for writing purposes. If, on the other hand, the E/O value is one (odd), then the odd array 65 is selected for writing purposes.

To summarize briefly how copies are made whenever data (nearly always "modified" data) is written into the buffer store 30 by the local store/ALU units 14A and 15A (FIG. 3a), the first thing that happens is that the main store address in BSAR 33 and the buffer store address at the output of address translator 34 are set into the copy register 41. This address information is then transferred to the copy register 70 in the copy units 17A and 18A (shown in both FIGS. 3b and 8a). At the same time, the buffer store address at the output of address translator 34 is set into the journal address register 90 (FIG. 8a). The journal 92 and the free space list 93 are then accessed. The valid bit from journal 92 is then examined. If it is zero, then the next copy store address from the free space list 93 is set into the journal output register 97. If the valid bit is one, then the previously assigned copy store address obtained from the journal 92 is set into the journal output register 97. The address in the journal output register 97 (including the high order DA bit) is then set into each of the copy array address registers 73 and 69. At this time, the DA signal is zero (also the LS signal is zero) so that the write command is supplied only to the copy array 64. This writes the address information contained in the copy register 70 into the lower half of the copy array 64 at the proper copy array address. This copies the main store and buffer store addresses into the array 64 as desired.

After the address information is written, the newly written buffer store data, which then resides in BSDR 31, is transferred to the copy register 41 and then to the copy register 70. At this time, the data versus address signal DA assumes a value of one to signify that data, as opposed to address information, is to be stored. This sets the journal output register 97 to address the upper halves of the arrays. It also activates the AND circuit 116 to enable the even/odd bit to control the selection of the proper one of the two arrays 64 and 65. The write command is then given and the buffer data now in copy register 70 is written into copy array 64 if the E/O bit value is zero or into the copy array 65 if the E/O bit value is one. After this, the new E/O bit value is written into the E/O array 105 and a one value is written into the line change array 104. Also, the double copy bit in array 103 is set to one if the valid bit has a one value.

The valid bit in latch 96 is then again examined. If the valid bit value is zero, then the copy address accessed from the free space list 93 is written into the journal 92 and the valid bit in journal 92 is set to one by writing in the one value normally appearing at the output of a NOT circuit 121. As will be seen, the valid bit will be reset to zero by the bit reset signal upon completion of the copyback of the corresponding buffer store data from the buffer store 30 to the main store 10. After the valid bit is set to one in journal 92, the next free space counter 94 is incremented by one count. This is accomplished by way of AND circuit 122, provided the valid bit in latch 96 is zero, in which case NOT circuit 123 supplies a one value to the other input of AND circuit 122. If the valid bit in latch 96 has a value of one instead of zero, this indicates that a valid copy address already exists in the journal 92. In this case, the next copy address from the free space list 93 is not written into the journal 92 and the NFS counter 94 is not incremented.

After doing the foregoing, a page change bit in a page change storage array 124 is set to one and detect circuits 125 and 126 are looked at to see if the buffer store areas of the copy stores 64 and 65 are getting nearly full. If they are not, then the buffer copy storage operation is complete and nothing further is done in the copy logic 72 until such a time as further data is written into the buffer store 30 by the local store/ALU units 14A and 15A. When further data is written into the buffer store 30, the above-described processes are repeated to copy the desired data and address information into the copy stores 64 and 65.

The table of FIG. 9 shows, in the before column, the sixteen mathematical permutations that are possible for the status bit group formed by the valid bit, the double copy bit, the line change bit and the even/odd bit for any given copy store address. The after column shows the corresponding condition of these status bits after completion of the copy logic operations accompanying a buffer store write from the local store/ALU units 14A and 15A. The occurrence of the term "INVALID" in the after column denotes that the status bit combination in the before column should not occur if the buffer copy logic 72 is operating properly. The right-hand column shows the location of the correct retry copy after completion of the buffer store copy operation.

Initially, the status bit condition is "0000" for any given buffer store address. After completion of the first buffer copy operation for such address, the condition is "1010". After the $T_0$ reset at the beginning of the next machine instruction cycle, the condition becomes "1000". After the next ensuing buffer copy operation, the condition becomes "1111". Thereafter, the valid and double copy bits remain at the one level and the change and E/O bits repetitively progress through their various possible permutations in accordance with the occurrence of subsequent buffer copy and $T_0$ reset operations. As indicated in the next-to-last line of the chart, all four of these status bits are reset to zero following completion of a copyback operation from the buffer store 30 to the main store 10.

When the buffer areas of the copy storage arrays 64 and 65 become nearly full, the situation is alleviated by causing the buffer store 30 to copy some of its IPU-modified data back into the main store 10. Once the buffer store data is copied back into the main store 10, the corresponding copy store copies are no longer needed and these copy store addresses may be released for reuse. For sake of efficiency, when data is transferred from the buffer store 30 back to the main store 10, four lines or storage locations of buffer store data are transferred back during one and the same copyback operation. For sake of a name, four lines of buffer storage data are herein called a "page". In other words, every group of four successive addressable locations in the buffer store 30 are thought of as constituting a page and, when a copyback operation is performed, one of these pages is copied back to the main store 10. This is done in a serial manner, one line or storage location at a time, but during one and the same copyback operation.

The page change bit storage array 124 in the copy logic 72 provides status information for determining whether or not a particular page should be copied back. In particular, a page should not be copied back to the main store 10 if any line on such page has had data written into it from the local store/ALU units 14A and 15A during the current machine instruction cycle.

The page change bit array 124 has a total of 256 addressable one-bit storage locations to take into account the four-to-one ratio of lines to pages in the buffer store 30. It is accessed by the higher order eight address bits in the journal address register 90. At the beginning of each machine instruction cycle, all 256 bits in the page change array 124 are set to zero by the $T_0$ reset signal. Thereafter, during a given machine instruction cycle, the page change bits are set to one, one at a time, as they are accessed by the journal address register 90. This is accomplished by writing in the one value normally appearing at the output of a NOT circuit 127. Thus, a page change bit value of one denotes that the corresponding buffer store page has been written into during the current machine instruction cycle, and a page change bit value of zero indicates that such page has not been written into during the current cycle. A given bit in the page change array 124 is also reset to zero after completion of the copyback to the main store 10 of the corresponding page in the buffer store 30. This is accomplished by means of AND circuit 128, the copyback complete signal and the bit reset signal.

Considering now the mechanism for determining when the copy arrays 64 and 65 are approaching the full condition for buffer store data, the first item that should be considered is a load free space (LFS) counter 130. This counter 130 is initially set at zero and is used after completion of a copyback to main store operation to point to the location on the free space list 93 at which the now-free copy address should be written or loaded. After each freed-up copy address is loaded back into the free space list 93, the LFS counter 130 is incremented by one count. Thus, in time, the LFS counter 130 will work its way up the free space list 93, the same as does the NFS counter 94 which is doing the handing out of the free space addresses. Thus, the difference in the readings of the NFS counter 94 and the LFS counter 130 shows how full are the buffer areas of the copy arrays 64 and 65. In other words, this difference is equal to the total number of three-location copy storage sets then in use, there being a maximum total of 128 such sets.

When the NFS counter 94 reaches a count of 127, it thereafter wraps back and starts over at a count of zero. The LFS counter 130 behaves in a similar manner. When it reaches a count of 127, it also wraps back and starts over at zero. Care is taken, however, that the count in the LFS counter 130 never moves past the count in the NFS counter 94. In other words, the LFS counter 130 should always lag behind and should never reach any given count before the NFS counter 94 does.

A subtract circuit 131 subtracts the count in the LFS counter 130 from the count in the NFS counter 94 to form the difference between such counts. This difference is supplied to detect circuits 125 and 126. The detect circuit 125 produces a one level output whenever the difference exceeds 85% of the maximum copy store capacity of 128 or, in other words, when the difference exceeds a value of 108. The detect circuit 126, on the other hand, produces a one level output whenever the difference exceeds 98% of the maximum copy store capacity. For a maximum capacity of 128, this occurs when the difference exceeds 125.

When the fullness of the buffer copy store exceeds 85% and the output of detect circuit 125 goes to one, a copyback search mechanism is activated to search for a buffer store page that can be copied back to the main store 10. This searching is done by means of a copyback (CB) counter 132. When 85% full is detected and an IPU write into buffer store 30 is not in progress (BS signal at zero at input of NOT circuit 134), the copyback counter 132 supplies an address by way of AND gates 133 to the address register 73 for the copy array 64. The highest order bit of this address is always zero so that the lower half of the array 64 is addressed. This causes an access and readout of the address information stored at the accessed copy store location. The buffer store address portion of this readout is then supplied by way of bus 135 back to the journal address register 90. This buffer store address is latched up in the journal address register 90 and used to access the journal 92, the valid bit from the journal 92 then being set into the latch circuit 96. At the same time the journal address register 90 also accesses the page change bit array 124.

At this point, the page change bit from array 124 and the valid bit in latch 96 are examined to determine whether this particular page is a qualified candidate for being paged back or copied back to the main store 10. This examination is performed by an AND circuit 136. It is assumed that at this time the 85% full input to the AND circuit 136 is at the one level. If either the page change bit is on (one) or the valid bit is off (zero), then this particular page is not a qualified candidate and a zero signal appears at the output of AND circuit 136. If the page change bit is on, this means that at least one line or location on this page has been written into during the current machine instruction cycle and the page should not be copied back. If the valid bit is off, this means that the copy store address being considered does not contain valid buffer store data and hence that this copy address is still on or has been returned to the free space list so as to be available for reuse.

The zero level signal at the output of AND circuit 136 is inverted by NOT circuit 137 and used to increment the copyback counter 132 by one count. The copyback counter 132 then addresses the next sequential copy store location and the foregoing process is repeated. This accessing of copy store addresses by the copyback counter 132 continues until a page is found which is a qualified candidate for copying back to the main store 10.

When a qualified candidate is found, its page change bit will have a value of zero and its valid bit will have a value of one. This produces a one level signal at the output of the AND circuit 136. This constitutes the copyback request signal. This copyback request signal is sent to the control circuitry 43 in the buffer storage unit 13A. At the same time, the buffer store address then in the journal address register 90 is sent back by way of bus 139 to the buffer store 30. Also, the main store address read from the copy array 64 and previously set into a main address register 140 is supplied back by way of bus 141 to the BSAR 33 in the buffer store 13A. The buffer store 13A then commences to perform the necessary operations and to copyback to the main store 10 the buffer store page identified by the address information received from the copy logic 72.

As it commences the copyback operation, the buffer store 13A sends a signal, designated as BW, back to the copy logic 72. This BW signal denotes that the buffer store 13A is working to perform the copyback. This signal is used by the copy logic 72 to enable performance of various housekeeping functions needed therein. Among other things, this BW signal activates an AND circuit 143 and resets a two-bit zero-to-three counter to the "00" condition.

The counter 144 is used to sequentially access the four journal entries in the journal 92 for the four buffer store addresses which make up the page which is being copied back to the main store 10. The first of these journal entries is accessed by sending the initial "00" count from the counter 144 to the journal address register 90 to replace the two lowest order bits therein. Register 90 then accesses the first of the desired journal entries and the valid bit is set into the latch 96. If the valid bit is zero, the only thing that need be done is to increment the counter 144 by one count. This is done by supplying an increment signal to the counter 144 by way of AND circuit 145. Counter 144 then sends the new count condition, namely "01", to the journal address register 90 to address the second of the four desired entries in the journal 92.

If the valid bit in the first accessed journal entry had instead been a one, then certain other housekeeping chores are required. In this case, that is, where the valid bit is one, the copy address accessed from the journal 92 is then set into the journal output register 97 by way of AND gates 99. This accesses the double copy bit array 103, the line change bit array 104 and the E/O bit array 105. At this point, the address in the journal output register 97 is written into the free space list array 93 at the location pointed to by the LFS counter 130. This returns this copy address to the free status and makes it available for reuse by a new buffer store address. A reset signal is then applied to AND circuit 143 by way of conductor 146. This produces a one-level bit reset signal which is supplied to NOT circuit 108 to reset the double copy bit in array 103 to zero, to the NOT circuit 109 to reset the line change bit in array 104 to zero and to the NOT circuit 115 to reset the E/O bit in array 105 to zero. The bit reset signal from AND circuit 143 is also supplied to the NOT circuit 121 to reset the valid bit in the journal 92 to zero. It is also sent to the AND circuit 128 so that if this is the last of the four journal entries being considered, the page change bit in array 124 will also be set to zero. The bit reset signal from AND circuit 143 is also sent to the LFS counter 130 to increment same by one count.

After the completion of these various housekeeping chores, the counter 144 is again incremented to cause the journal address register 90 to access the next of the four journal entries being considered. The housekeeping chores for this next entry are then performed and the counter 144 again incremented. This process continues until the counter 144 reaches its fourth count condition, namely, the "11" condition. This "11" condition is detected by detect circuit 147 and this causes the output of the detect circuit 147 to go to the one level. This one level is inverted by a NOT circuit 148 to deactivate the AND circuit 145. This prevents further incrementing of the counter 144 until such time as the next buffer store page is copied back to the main store 10. This completes the copyback actions required within the copy logic 72. Also, the occurrence of the one level at the output of the detect circuit 147 constitutes a "copyback complete" signal which is sent back by way of conductor 149 to the control circuitry 43 in the buffer store 13A. Thereafter, the control circuitry 43 turns off the BW signal sent to the copy logic 72.

It should be noted that once the 85% full condition is detected by detect circuit 125, the copyback mechanism will cause the buffer store 30 to continue to copy pages of data back to the main store 10 until an under-85%-full condition is indicated by the detect circuit 125, at which time the output of detect circuit 125 goes to a zero level. It is also noted that the copyback searching action in the copy logic 72 is being performed only during those intervals occurring between the normal IPU-to-buffer-store write cycles. Thus, an IPU-to-buffer-store write cycle will not be delayed by the copyback mechanism. This condition changes, however, when the 98% full condition is detected by the detect circuit 126. When this 98% full condition is detected, the output of detect circuit 126 goes to the one level. This constitutes a checkpoint request signal which is sent by way of conductor 150 to the control circuitry 43 in buffer unit 13A. This signal causes the buffer unit 13A to delay processing of any further IPU-to-buffer-store write cycles until at least one page of buffer store data has been copied back to the main store 10. This, of course, prevents overloading of the copy stores 64 and 65. This checkpoint request signal from detect circuit 126 also causes the system to generate an arbitrary checkpoint. This is accomplished by an arbitrary and forced issuance of the $T_0$ reset signal. In the event of an error or failure, the system can then recover at this arbitrary checkpoint.

In the event of an error or failure in any of the instruction processing units 13A–16A, all of the buffer data and address information in the copy array 64 and all of the buffer and local store data in copy array 65 are read into the service processor 22 by way of the assembler register 74. The contents of the journal array 92, including the valid bits, are also read into the service processor 22 by the assembler register 74. In addition, the entire contents of the following status bit arrays are also supplied to the service processor 22 by way of the assembler register 74: double copy array 103, line change array 104, even/odd bit array 105 and page change bit array 124.

With the aid of these status bits, including the valid bit from journal 92, the service processor 22 is able to restore the data in the system to the condition which existed at the end of the machine instruction cycle immediately proceding the instruction cycle during which the failure occurred. With respect to the buffer store data in particular, the service processor 22 proceeds to modify the corresponding data in the main store 10 which has had its copy modified in the buffer store 30 but where the buffer copy has not yet been copied back to the main store 10 at the time of the failure. The manner in which the service processor 22 utilizes the various status bits to select the proper buffer store copies for this purpose is indicated in the table of FIG. 9. The right-hand column of such table shows the locations of the correct retry copies for the different possible status bit combinations.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a data processing system having a data store and address circuitry for accessing such data store, the combination comprising:

a copy store system having a set of at least two separately addressable copy storage locations for each of a plurality of data store addresses;

circuitry for supplying to the copy store system the same data as is supplied to the data store for storage therein;

and copy store address circuitry responsive to the address supplied to the data store address circuitry for controlling the address at which the data is copied in the copy store system, such copy store address circuitry including circuitry for causing data stored at the same data store address during different data processing instruction cycles to be alternately copied into different ones of the copy storage locations in the same copy store set.

2. In a data processing system having a buffer store and address circuitry for accessing such buffer store, the combination comprising:

a copy store system having a set of at least two separately addressable copy storage locations for each of a plurality of buffer store addresses;

circuitry for supplying to the copy store system the same data as is supplied to the buffer store for storage therein:

and copy store address circuitry responsive to the address supplied to the buffer store address circuitry for controlling the address at which the data is copied in the copy store system, such copy store address circuitry including circuitry for causing data stored at the same buffer store address during different data processing instruction cycles to be alternately copied into different ones of the copy storage locations in the same copy store set.

3. In a data processing system having a local store and address circuitry for accessing such local store, the combination comprising:

a copy store system having a set of two separately addressable copy storage locations for each local store addresses;

circuitry for supplying to the copy store system the same data as is supplied to the local store for storage therein;

and copy store address circuitry responsive to the address supplied to the local store address circuitry for controlling the address at which the data is copied in the copy store system, such copy store address circuitry including circuitry for causing data stored at the same local store address during different data processing instruction cycles to be alternately copied into different ones of the copy storage locations in the same copy store set.

4. In a data processing system having a data store and address circuitry for accessing such data store, the combination comprising;

a copy store having a plurality of sets of separately addressable even and odd storage locations;

circuitry for supplying to the data input of the copy store the same data as is supplied to the data store;

copy store address circuitry for controlling the address at which the data is stored in the copy store;

an even/odd status store having an addressable status bit location for each set of copy storage locations for keeping track of which one of the even and odd copy store locations was last used in each set;

status store address circuitry for accessing the even-/odd status store;

circuitry responsive to the data store address circuitry for supplying a copy store set address to both the copy store address circuitry and the status store address circuitry, the latter being responsive thereto to access the corresponding status bit location in the even/odd status store;

and even/odd logic circuitry responsive to the binary value stored at the accessed status bit location for supplying an additional address signal to the copy store address circuitry for causing the current data to be stored at the particular one of the even and odd copy store locations which was not last used in the addressed copy store set, this logic circuitry including circuitry for inverting the binary value stored at the accessed status bit location to make it indicative of the newly used one of the even and odd copy store locations.

5. In a data processing system having a data store and address circuitry for accessing such data store, the combination comprising:

a copy store having a set of separately addressable even and odd copy storage locations for each data store address;

circuitry for supplying to the data input of the copy store the same data as is supplied to the data store;

copy store address circuitry for controlling the address at which the data is stored in the copy store;

an even/odd status store having an addressable status bit location for each data store address for keeping track of which one of the even and odd copy store locations was last used for each of the data store addresses;

status store address circuitry for accessing the even-/odd status store;

circuitry coupled to the data store address circuitry for supplying the current data store address to both the copy store address circuitry and the status store address circuitry, the latter being responsive thereto to access the corresponding status bit location in the even/odd status store;

and even/odd logic circuitry responsive to the binary value stored at the accessed status bit location for supplying an additional address bit to the copy store address circuitry for causing the current data to be stored at the particular one of the even and odd copy store locations which was not last used, this logic circuitry including circuitry for inverting the binary value stored at the accessed status bit location to make it indicative of the newly used one of the even and odd copy store locations.

6. In a data processing system having a data store and address circuitry for accessing such data store, the combination comprising;

a copy store having a plurality of sets of separately addressable even and odd copy storage locations;

circuitry for supplying to the data input of the copy store the same data as is supplied to the data store;

copy store address circuitry for controlling the address at which the data is stored in the copy store;

an even/odd status store having an addressable status bit location for each set of copy storage locations for keeping track of which one of the even and odd copy store locations was last used in each set;

a change status store having an addressable change bit location for each set of copy storage locations for storing a change value the first time the corresponding copy store set is addressed during the current machine instruction cycle;

reset circuitry for resetting all change bit locations in the change status store to a no change value at the beginning of each new machine instruction cycle;

status store address circuitry for accessing both the even/odd status store and the change status store;

circuitry responsive to the data store address circuitry for supplying a copy store set address to both the copy store address circuitry and the status store address circuitry, the latter being responsive thereto to access the corresponding status bit location in the even/odd status store and the corresponding change bit location in the change status store;

and even/odd logic circuitry responsive to both the accessed even/odd status bit and the accessed change bit for supplying an additional address signal to the copy store address circuitry for causing the current data to be stored at the particular one of the even and odd copy store locations which was not last used in the addressed copy store set if the accessed change bit has a no change value and for causing the current data to be stored at the last used one of the even and odd copy store locations in the addressed copy store set if the accessed change bit has a change value, this logic circuitry including circuitry for inverting the bit value stored at the accessed even/odd status bit location if the accessed change bit has a no change value.

7. In a data processing system having a data store and address circuitry for accessing such data store, the combination comprising:

a copy store having a set of separately addressable even and odd copy storage locations for each data store address;

circuitry for supplying to the data input of the copy store the same data as is supplied to the data store;

copy store address circuitry for controlling the address at which the data is stored in the copy store;

an even/odd status store having an addressable status bit location for each data store address for keeping track of which one of the even and odd copy store locations was last used for each of the data store addresses;

a change status store having an addressable change bit location for each data store address for storing a change value the first time the corresponding data store address is accessed during the current machine instruction cycle:

reset circuitry for resetting all change bit locations in the change status store to a no change value at the beginning of each new machine instruction cycle;

status store address circuitry for accessing both the even/odd status store and the change status store;

circuitry coupled to the data store address circuitry for supplying the current data store address to both the copy store address circuitry and the status store address circuitry, the latter being responsive thereto to access the corresponding status bit location in the even/odd status store and the corresponding change bit location in the change status store;

and even/odd logic circuitry responsive to both the accessed even/odd status bit and the accessed change bit for supplying an additional address bit to the copy store address circuitry for causing the current data to be stored at the particular one of the even and odd copy store locations which was not last used if the accessed change bit has a no change value and for causing the current data to be stored at the last used one of the even and odd copy store locations if the accessed change bit has a change value, this logic circuitry including circuitry for inverting the bit value stored at the accessed even/odd status bit location if the accessed change bit has a no change value.

8. In a data processing system having a relatively large data store for storing data, processor apparatus for manipulating data and a buffer store for buffering data moving between the large data store and the processor apparatus, the combination comprising:

a copy store having a lesser number of addressable storage locations than the buffer store for storing for retry purposes duplicate copies of processor manipulated data items supplied to the buffer store;

a free list store for storing copy store address values which are free and available for use;

a journal store having an addressable storage location for each buffer store address for recording the copy store addresses that may be assigned to different ones of the buffer store addresses at any given moment;

circuitry responsive to the buffer store address for each item of processor manipulated data supplied to the buffer store for supplying to the copy store and the address at which the duplicate copy of such item is to be stored and including selection circuitry for obtaining such copy store address from the journal store if the journal store contains a valid copy store address for that buffer store address and for obtaining such copy store address from the free list store if the journal store does not contain a valid copy store address for that buffer store address;

circuitry operative if the copy store address is taken from the free list store for recording such copy store address in the journal storage location for that buffer store address;

and circuitry operative when the copy store approaches a full condition for causing the buffer store to transfer some of its processor manipulated data back to the large data store, this circuitry including circuitry for invalidating the journal store entries for the corresponding buffer store addresses and for returning the invalidated copy store addresses to the free list store.

9. The combination of claim 8 and further including:

a valid status store associated with the journal store and having an addressable valid bit location for each buffer store address for indicating whether the corresponding journal storage location contains a valid copy store address;

circuitry responsive to the current buffer store address for accessing both the journal store and the valid status store;

and circuitry for supplying the accessed valid bit to the selection circuitry for controlling the source from which the copy store address is obtained.

10. The combination of claim 8 wherein the copy storage locations are grouped into sets of even and odd copy storage locations, the free list store stores copy store set addresses and the journal store records copy store set addresses and wherein the combination further includes:

copy store address circuitry for controlling the address at which the data is stored in the copy store;

an even/odd status store having an addressable status bit location for each set of copy storage locations for keeping track of which one of the even and odd copy store locations was last used in each set;

status store address circuitry for accessing the even/odd status store;

circuitry coupled to the output of the selection circuitry for supplying a copy store set address to both the copy store address circuitry and the status store address circuitry;

and even/odd logic circuitry responsive to the accessed even/odd status bit value for supplying an additional address signal to the copy store address circuitry for causing the current data to be stored at the particular one of the even and odd copy store locations which was not last used in the addressed copy store set, this logic circuitry including circuitry for inverting the bit value stored at the accessed even/odd status bit location to make it indicative of the newly used one of the even and odd copy store locations.

* * * * *

UNITED STATES PATENT OFFICE
CERTIFICATE OF CORRECTION

PATENT NO. : 4,044,337
DATED : August 23, 1977
INVENTOR(S) : Glen LeRoy Hicks et al It is certified that error appears in the above-identified patent and that said Letters Patent are hereby corrected as shown below:

On the cover page, in the ABSTRACT, second column, line 19, "storage" should read --store--; line 22, insert a period --.-- after "data". Column 1, line 10, "ward-generated" should read --ware-generated--; line 30, "changed," should read --changed.--; line 37, "McGilvary" should read --McGilvray--; line 39, "described" should read --describes--; line 47, insert a comma --,-- after "Oct. 6"; line 63, the material beginning with "U. S. Patent No." should be a new paragraph; line 64, insert a comma --,-- after "et al". Column 2, line 24, "Codending" should read --Copending--; line 41, "change" should read --changed--. Column 3, line 52, "modifications" should read --modification--. Column 4, line 12, "unti" should read --unit--; line 25, the material beginning with "FIG. 2 shows" should be a new paragraph. Column 7, line 24, "othewise" should read --otherwise--; line 64, "System7" should read --System/7--; line 66, "New york" should read --New York--. Column 8, line 44, "BSDER" should read --BSDR--. Column 9, line 11, "storeALU" should read --store/ALU--; line 12, "storeALU" should read --store/ALU--; line 28, "System360" should read --System/360--; line 32, "storeALU" should read --store/ALU--; line 41, "truecomplement" should read --true/complement--; line 68, "but" should read --bus--. Column 10, line 55, "and" should read --an--. Column 11, line 35, "location O" should read --location 0--. Column 12, line 48, "$T_0$" should read --$T_0$--. Column 13, line 16, "$T_0$" should read --$T_0$--; line 28, "sixbit" should read --six-bit--; line 39, "$T_0$" should read --$T_0$--. Column 14, line 4, "Chect" should read --Check--; line 12, "jounal" should read --journal--. Column 22, line 54, "proceding" should read --preceding--. Column 23, line 66, after

UNITED STATES PATENT OFFICE
CERTIFICATE OF CORRECTION

PATENT NO. : 4,044,337
DATED : August 23, 1977
INVENTOR(S) : Glen LeRoy Hicks et al It is certified that error appears in the above-identified patent and that said Letters Patent are hereby corrected as shown below:

"odd" insert --copy--.

Column 26, line 36, delete "and".

Signed and Sealed this

First Day of August 1978

[SEAL]

Attest:

RUTH C. MASON
Attesting Officer

DONALD W. BANNER
Commissioner of Patents and Trademarks